US009766673B2

(12) United States Patent
Varma et al.

(10) Patent No.: US 9,766,673 B2
(45) Date of Patent: Sep. 19, 2017

(54) SUPERCAPACITOR-BASED POWER SUPPLY PROTECTION FOR MULTI-NODE SYSTEMS

(71) Applicant: Intel Corporation, Santa Clara, CA (US)

(72) Inventors: Ankush Varma, Hillsboro, OR (US); Vasudevan Srinivasan, Hillsboro, OR (US); Eugene Gorbatov, Hillsboro, OR (US); Andrew D. Henroid, Portland, OR (US); Barnes Cooper, Tigard, OR (US); David W. Browning, Beaverton, OR (US); Guy M. Therien, Beaverton, OR (US); Neil W. Songer, Santa Clara, CA (US); Krishnakanth V. Sistla, Beaverton, OR (US); James G. Hermerding, II, Vancouver, WA (US)

(73) Assignee: Intel Corporation, Santa Clara, CA (US)

( * ) Notice: Subject to any disclaimer, the term of this patent is extended or adjusted under 35 U.S.C. 154(b) by 98 days.

(21) Appl. No.: 14/633,438

(22) Filed: Feb. 27, 2015

(65) Prior Publication Data

US 2016/0252942 A1    Sep. 1, 2016

(51) Int. Cl.
| | | |
|---|---|---|
| *G06F 1/00* | (2006.01) | |
| *G06F 1/32* | (2006.01) | |
| *G06F 1/26* | (2006.01) | |
| *G06F 1/20* | (2006.01) | |
| *G06F 15/00* | (2006.01) | |

(52) U.S. Cl.
CPC .............. *G06F 1/263* (2013.01); *G06F 1/206* (2013.01); *G06F 1/324* (2013.01); *G06F 1/3212* (2013.01); *G06F 15/00* (2013.01)

(58) Field of Classification Search
CPC ..................................... G06F 1/32; G06F 1/26
See application file for complete search history.

(56) References Cited

U.S. PATENT DOCUMENTS

| | | | |
|---|---|---|---|
| 6,809,504 B2 | 10/2004 | Tang et al. | |
| 7,085,943 B2 | 8/2006 | Chun et al. | |
| 8,645,886 B2 | 2/2014 | Abhishek et al. | |
| 2002/0070718 A1 | 6/2002 | Rose | |
| 2002/0135338 A1 | 9/2002 | Hobrecht et al. | |
| 2002/0144036 A1* | 10/2002 | Osburn | G06F 1/26 710/104 |
| 2004/0268159 A1* | 12/2004 | Aasheim | G06F 1/3203 713/300 |
| 2009/0276641 A1 | 11/2009 | Peng et al. | |
| 2009/0279224 A1 | 11/2009 | Ayyanar et al. | |

(Continued)

OTHER PUBLICATIONS

Gabriel Torres, "Everything You Need to Know About the Motherboard Voltage Regulator Circuit," Feb. 10, 2010, 10 pages.

(Continued)

*Primary Examiner* — Phil Nguyen
(74) *Attorney, Agent, or Firm* — Trop, Pruner & Hu, P.C.

(57) ABSTRACT

In one embodiment, a system includes: a plurality of compute nodes to couple in a chassis; a first shared power supply to provide a baseline power level to the plurality of compute nodes; and an auxiliary power source to provide power to one or more of the plurality of compute nodes during operation at a higher power level than the baseline power level. Other embodiments are described and claimed.

20 Claims, 12 Drawing Sheets

(56) References Cited

U.S. PATENT DOCUMENTS

| | | |
|---|---|---|
| 2010/0060083 A1 | 3/2010 | Rolland |
| 2011/0133709 A1 | 6/2011 | Mengad |
| 2012/0079290 A1 | 3/2012 | Kumar |
| 2012/0159198 A1 | 6/2012 | Naffziger et al. |
| 2013/0124892 A1* | 5/2013 | Lu .............................. G06F 1/30 713/322 |
| 2013/0232357 A1* | 9/2013 | Nagata .................... G06F 1/324 713/322 |
| 2014/0082377 A1 | 3/2014 | Dinh et al. |
| 2014/0082381 A1 | 3/2014 | Dinh et al. |

OTHER PUBLICATIONS

International Application No. PCT/US12/28865, filed Mar. 13, 2012, entitled "Providing Energy Efficient Turbo Operation of a Processor," by Intel Corporation.
U.S. Patent and Trademark Office, Office Action mailed Jan. 5, 2015, with Reply filed Mar. 30, 2015, in U.S. Appl. No. 13/616,982.
U.S. Patent and Trademark Office, Office Action mailed Jan. 5, 2015, with Reply filed Mar. 30, 2015, in U.S. Appl. No. 13/785,270.
U.S. Appl. No. 14/039,193, filed Sep. 27, 2013, entitled "Constraining Processor Operation Based on Power Envelope Information," by Avinash N. Ananthakrishnan, et al.
Wikipedia.org, "Supercapacitor," Feb. 26, 2015, 34 pages.

* cited by examiner

SUPERCAPACITOR-BASED POWER SUPPLY PROTECTION FOR MULTI-NODE SYSTEMS

TECHNICAL FIELD

Embodiments relate to power management of a system, and more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. This ever increasing computing device energy consumption can strain power supply resources, particularly in systems having multiple compute nodes.

Multi-node compute systems (such as a rack of servers) often use a shared power supply (rather than a single power supply per node) to improve efficiency. Today such shared power supplies are required to be sized for the sum of the maximum peak power (Pmax) of all compute nodes connected to them. Although this maximum peak power occurrence is a rare event, it is required to be supported to prevent a system crash if all nodes do have a concurrent Pmax event. Designing a power supply to accommodate the sum of Pmax for each computing node increases system cost and power budget undesirably.

DETAILED DESCRIPTION

Figure 1:
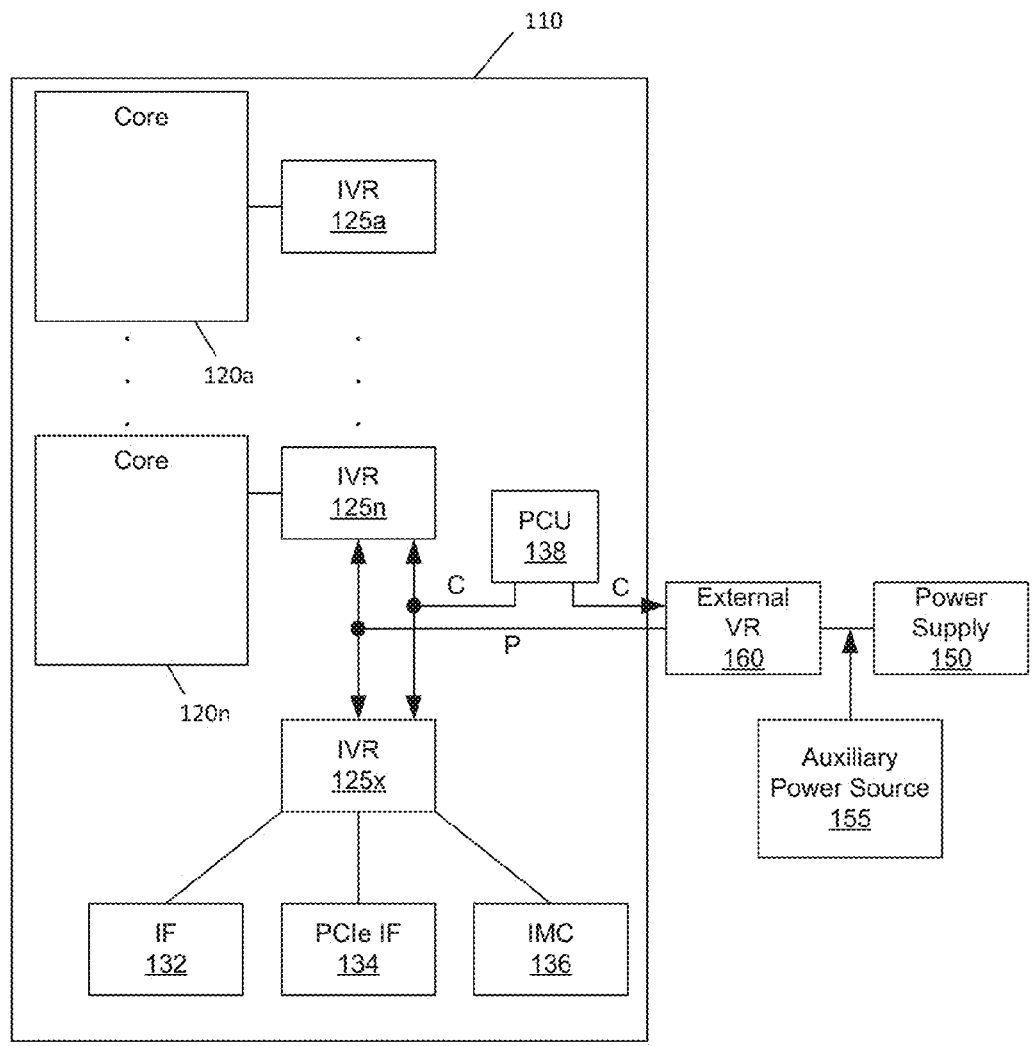
FIG. 1 is a block diagram of a portion of a system in accordance with an embodiment of the present invention.

In various embodiments, a shared power supply for a group of computing nodes may be sized closer to an actual (real-world) maximum power likely to be consumed by the group of nodes, while still enabling complete survivability (without system crash) in a true concurrent-Pmax corner case, should it occur. This power supply design may be realized by provision of an additional power delivery mechanism such as a supercapacitor or a battery to accommodate Pmax situations. More specifically, the combination of a shared power supply and an auxiliary power source enables a high power (Pmax) event, which has a well-understood and well-specified duration and magnitude or spike, to be supported.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and energy efficiency in products that encompass a large portion of the US economy.

Referring now to FIG. 1, shown is a block diagram of a portion of a system in accordance with an embodiment of the present invention. As shown in FIG. 1, system 100 may be a given server, micro-server, or any other system to be adapted in a multi-computer collection of equipment to be powered using an embodiment of the present invention. System 100 includes various components, including a processor 110 which as shown is a multicore processor. Processor 110 may be coupled to a power supply 150 via an external voltage regulator 160, which may perform a first voltage conversion to provide a primary regulated voltage to processor 110.

In various embodiments, power supply 150 may be implemented by way of a shared power supply to be shared between system 100 and similar such systems in a multi-computer configuration, such as various servers implemented in a chassis with the common power supply. In addition, as described herein a charge storage device such as a supercapacitor may be coupled as an auxiliary power source 155 between power supply 150 and system 100. This arrangement provides coverage for power spikes while maintaining a lower cost, smaller, lower power consuming shared power supply that is sufficient to meet any power spikes within the multi-computer arrangement.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be enable operation for an Intel® Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software). In some cases, PCU 138 may include logic to prevent processor 110 from operating at a maximum power level for at least a latency duration after operation at such power level, as described further herein.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle. Although described with these particular examples, understand that many other power management techniques may be used in particular embodiments.

Figure 2:
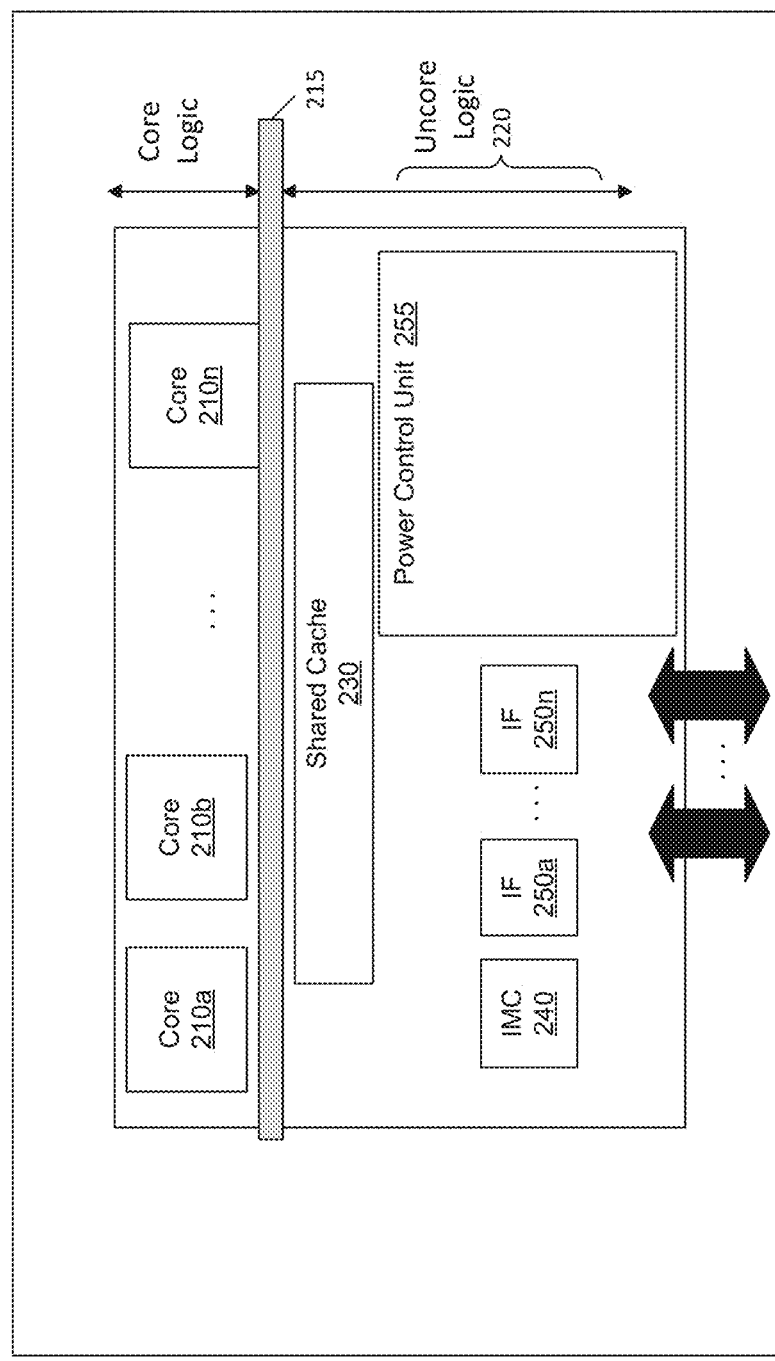
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload. The various cores may be coupled via an interconnect 215 to a system agent or uncore 220 that includes various components. As seen, the uncore 220 may include a shared cache 230 which may be a last level cache. In addition, the uncore may include an integrated memory controller 240 to communicate with a system memory (not shown in FIG. 2), e.g., via a memory bus. Uncore 220 also includes various interfaces 250 and a power control unit 255, which may include logic to perform the power management techniques described herein. In an embodiment, power control unit 255 may include logic to control operation of processor 200 in given power states, and prevent operation at a maximum power level for longer than a threshold duration (and also to prevent consecutive excursions to such power level for at least a latency duration).

In addition, by interfaces 250a-250n, connection can be made to various off-chip components such as peripheral devices, mass storage and so forth. While shown with this particular implementation in the embodiment of FIG. 2, the scope of the present invention is not limited in this regard.

Figure 3:
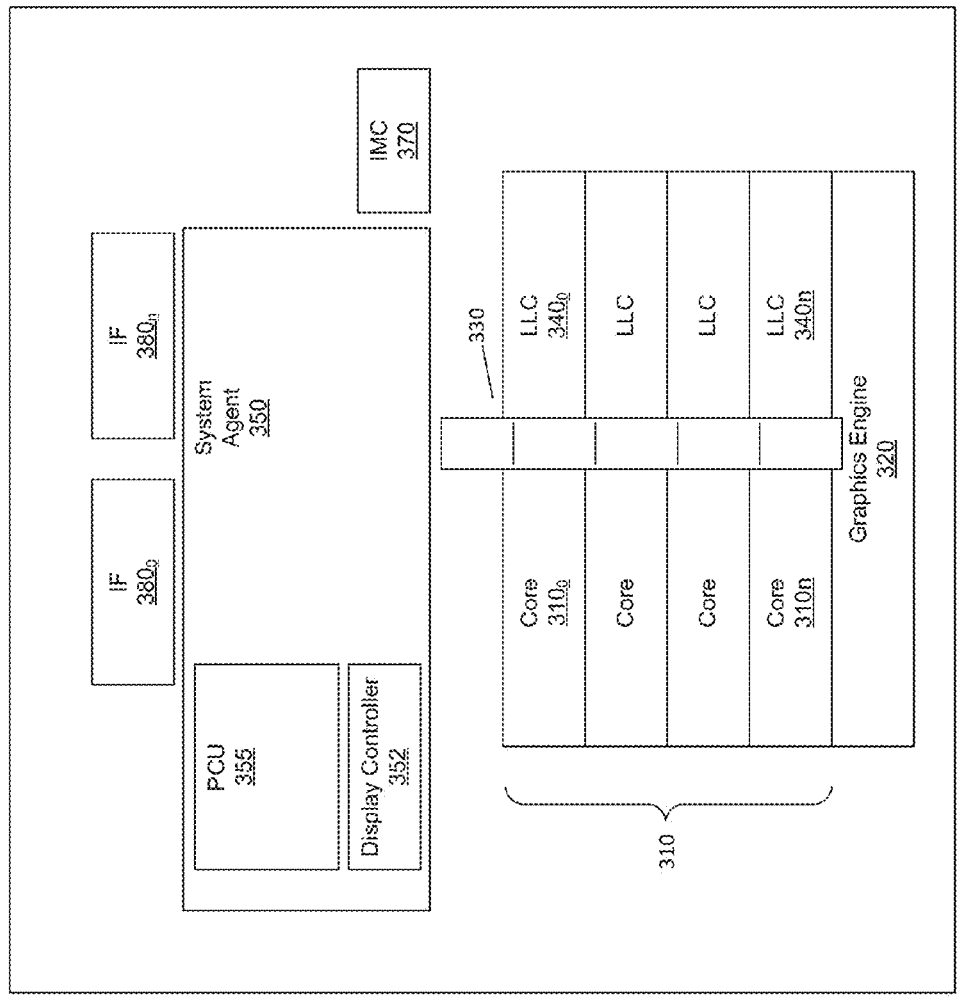
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355 which can include logic to perform the power management techniques described herein, including the maximum power level control protections described herein.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
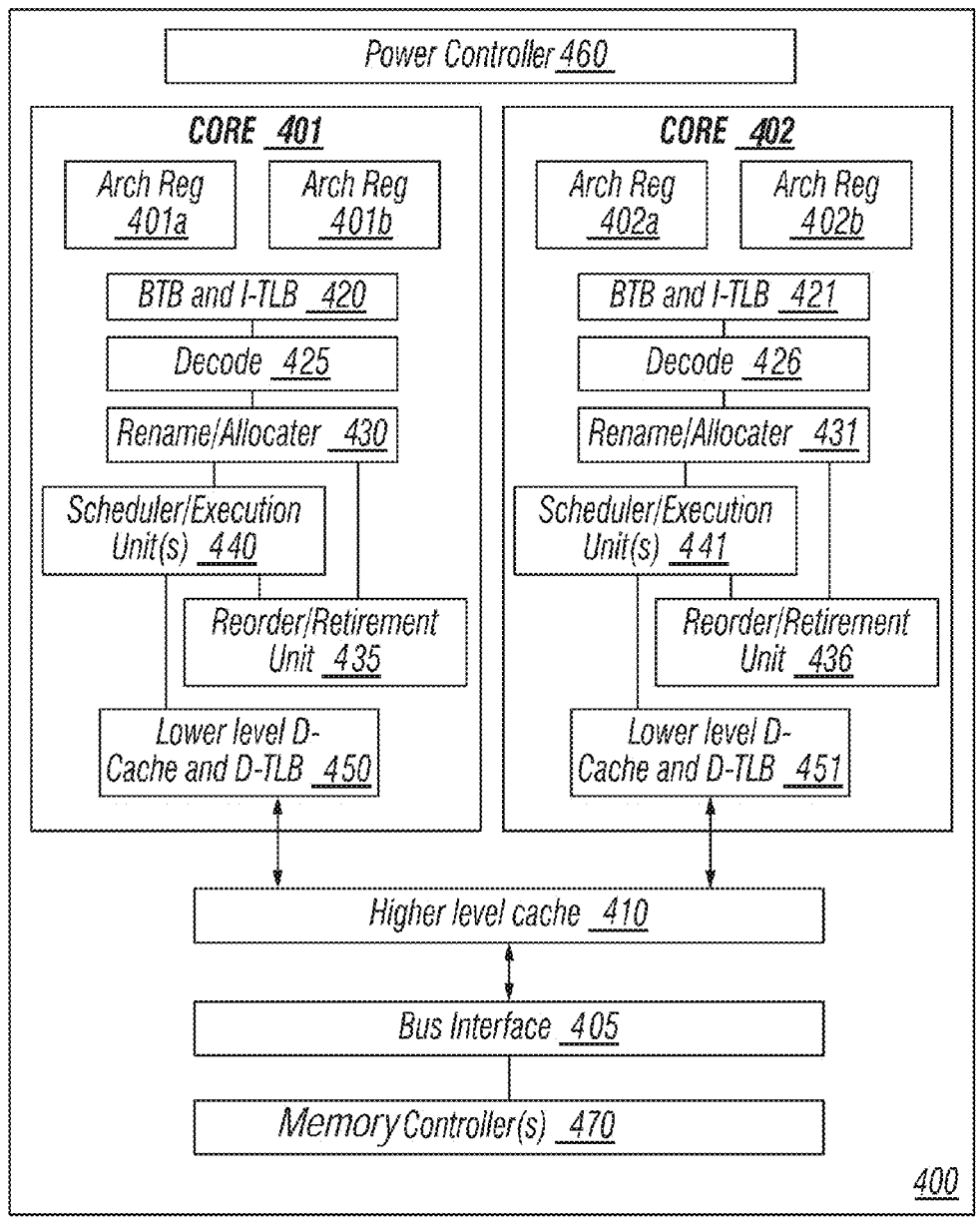
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401*a* and 401*b*, which may also be referred to as hardware thread slots 401*a* and 401*b*. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401*a*, a second thread is associated with architecture state registers 401*b*, a third thread may be associated with architecture state registers 402*a*, and a fourth thread may be associated with architecture state registers 402*b*. Here, each of the architecture state registers (401*a*, 401*b*, 402*a*, and 402*b*) may be referred to as processing elements, thread slots, or thread units, as described above. As illustrated, architecture state registers 401*a* are replicated in architecture state registers 401*b*, so individual architecture states/contexts are capable of being stored for logical processor 401*a* and logical processor 401*b*. In core 401, other smaller resources, such as instruction pointers and renaming logic in allocator and renamer block 430 may also be replicated for threads 401*a* and 401*b*. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401*a*, 401*b*, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401*a* and 401*b* are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
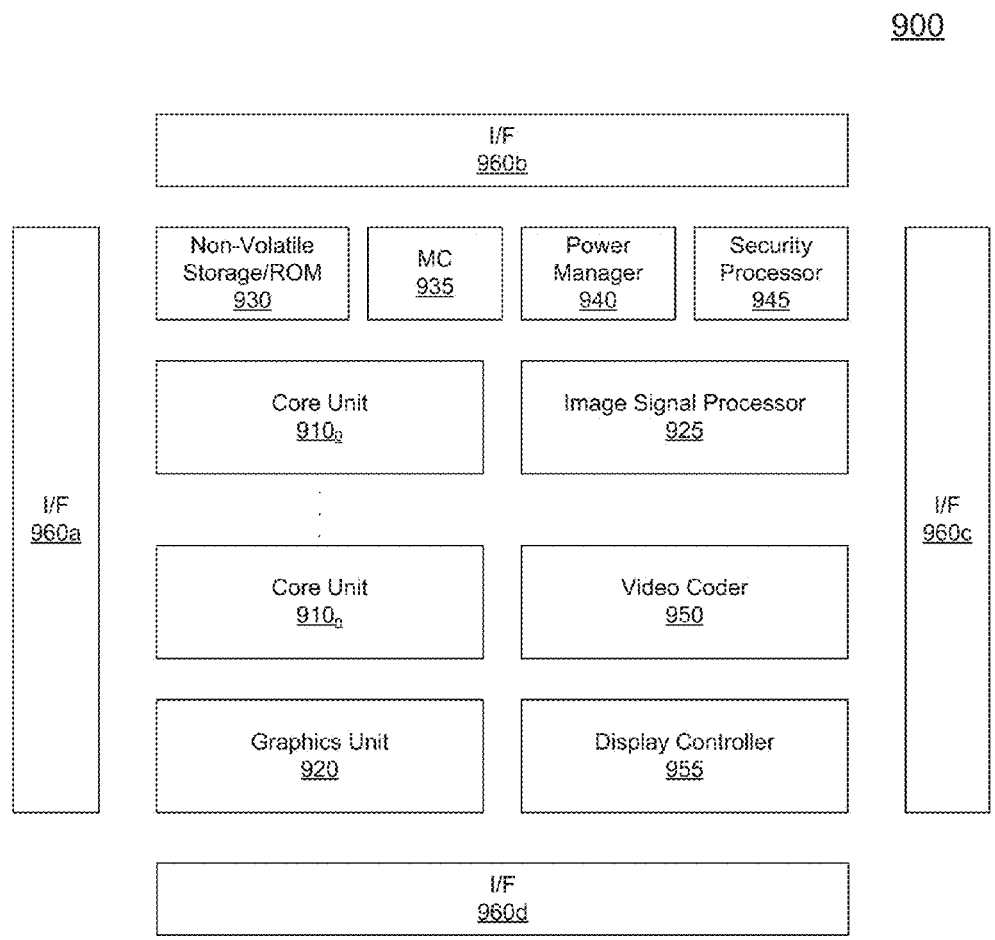
FIG. 5 is a block diagram of a processor in accordance with another embodiment of the present invention.

Referring now to FIG. 5, shown is a block diagram of a processor in accordance with another embodiment of the present invention. In the embodiment of FIG. 5, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device.

In the high level view shown in FIG. 5, processor 900 includes a plurality of core units $910_0$-$910_n$. Each core unit may include one or more processor cores, one or more cache memories and other circuitry. Each core unit 910 may support one or more instruction sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level two (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 5).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 5, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 6:
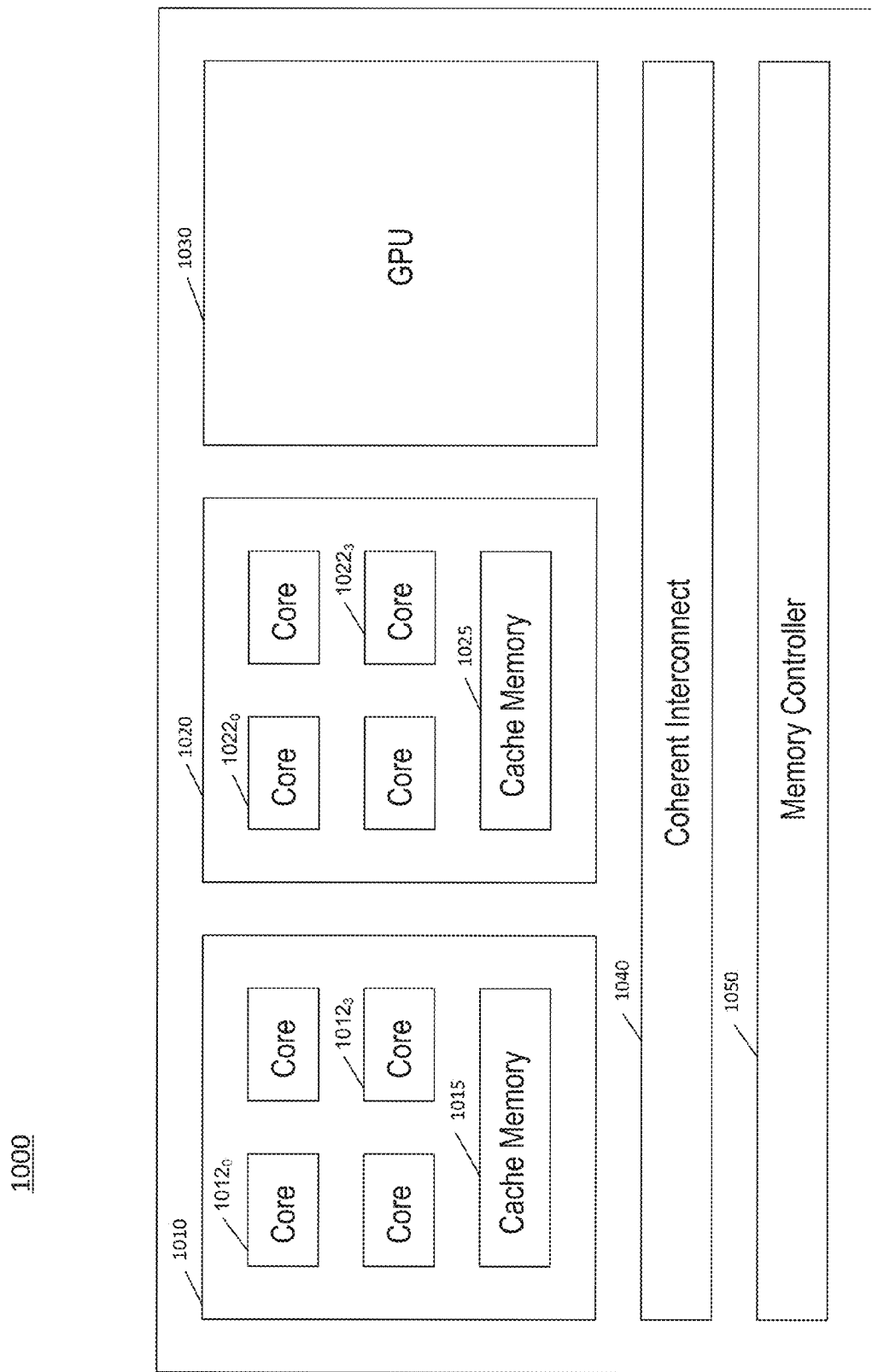
FIG. 6 is a block diagram of a representative SoC in accordance with an embodiment of the present invention.

Referring now to FIG. 6, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 6, SoC 1000 includes a first core domain 1010 having a plurality of first cores $1012_0$-$1012_3$. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 6, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 6 includes 4 cores in each domain, understand that more or fewer cores may be present in a given domain in other examples.

With further reference to FIG. 6, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 6).

In different examples, the number of the core domains may vary. For example, for a low power SoC suitable for incorporation into a mobile computing device, a limited number of core domains such as shown in FIG. 6 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 7:
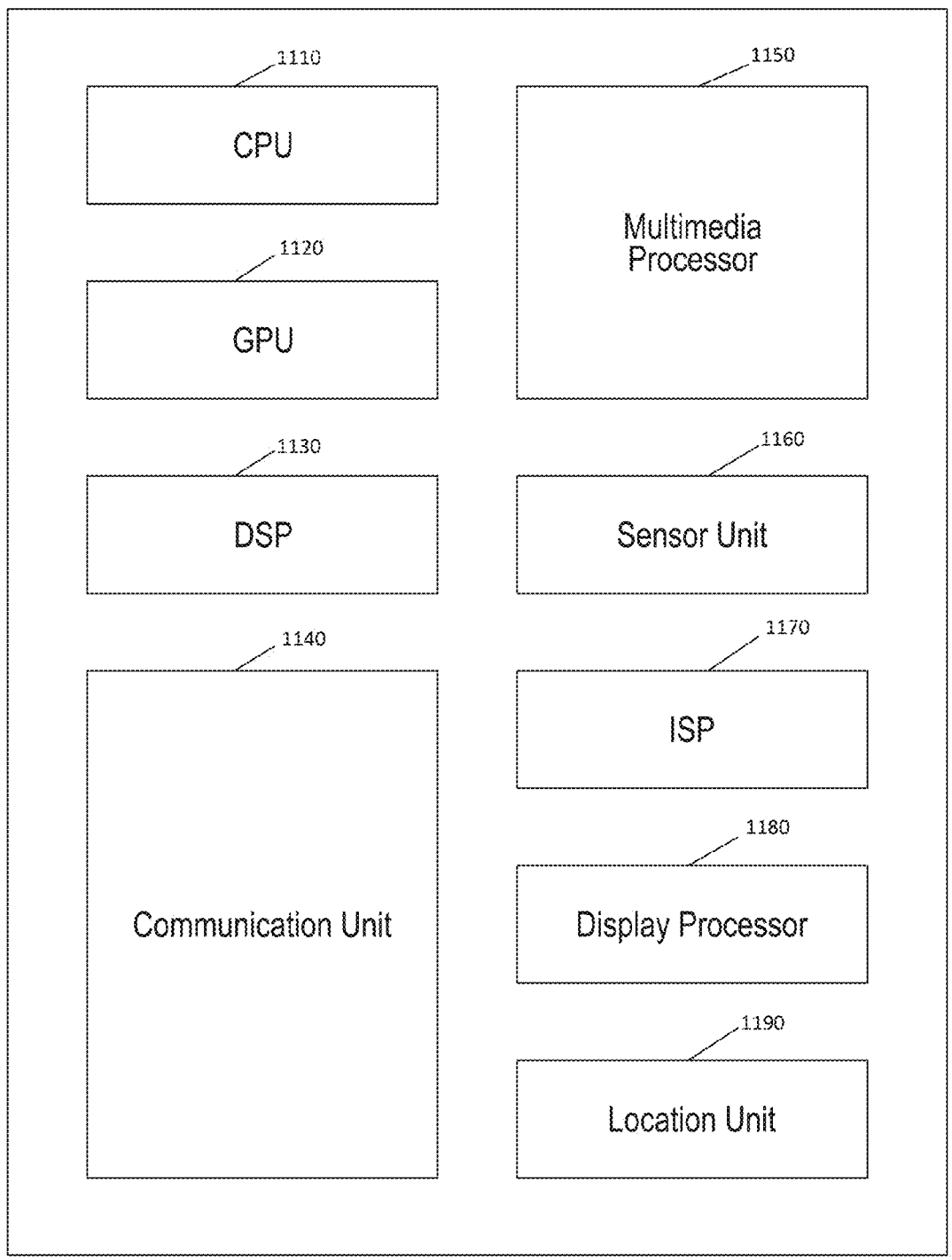
FIG. 7 is a block diagram of another example SoC in accordance with an embodiment of the present invention.

Referring now to FIG. 7, shown is a block diagram of another example SoC. In the embodiment of FIG. 7, SoC 1100 may include various circuitry to enable high performance for multimedia applications, communications and other functions such as may be incorporated into a microserver or other low power system. SoC 1100 may also be suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 7, many variations and alternatives are possible.

Figure 8:
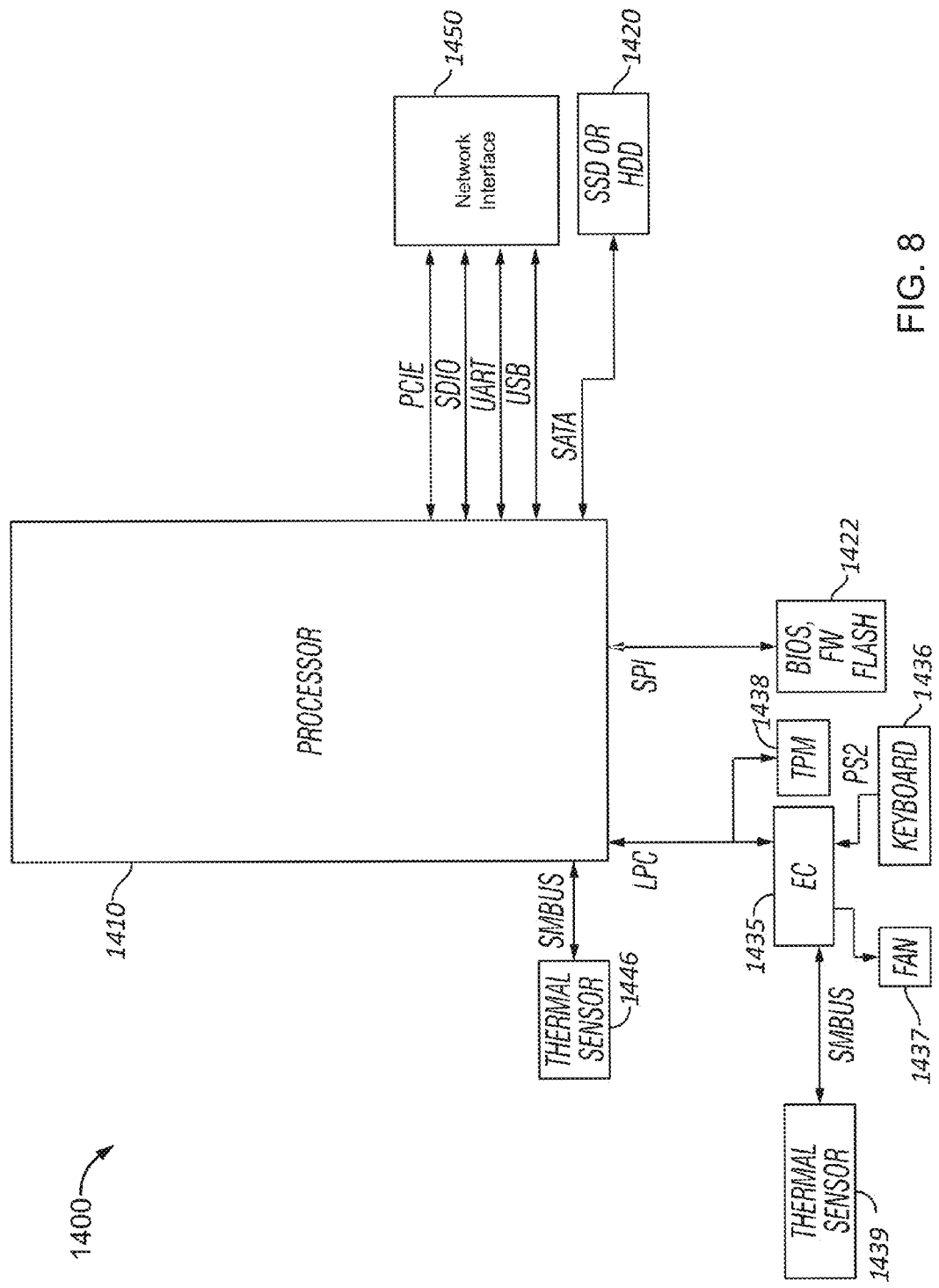
FIG. 8 is a block diagram of a representative computer system.

Referring now to FIG. 8, shown is a block diagram of a representative computer system such as small form factor system such as a micro-server. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1410 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache. Also shown in FIG. 8, a flash device 1422 may be coupled to processor 1410, e.g., via a serial peripheral interface (SPI). This flash device may provide for non-volatile storage of system software, including a basic input/output software (BIOS) as well as other firmware of the system. Various input/output (I/O) devices may be present within system 1400.

Also seen in FIG. 8, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In addition, a security processor such as a trusted platform module (TPM) 1438 may also couple to processor 1410 via this LPC interconnect. System 1400 can communicate with external devices in a variety of manners, including wired and wirelessly. In the embodiment shown in FIG. 8, a network module 1450 provides an interface configured for a particular communication protocol.

Figure 9:
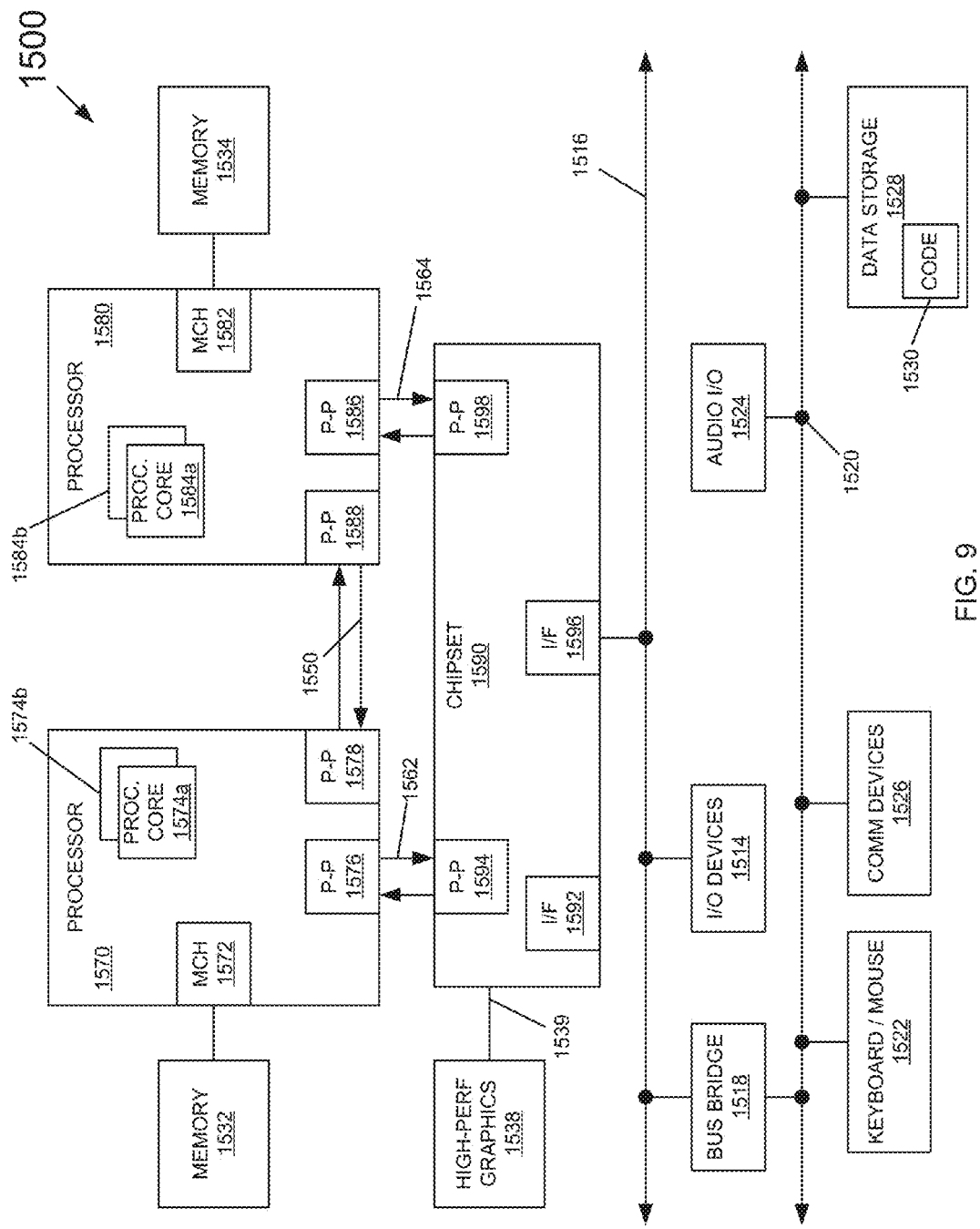
FIG. 9 is a block diagram of a system in accordance with an embodiment of the present invention.

Embodiments may be implemented in many different system types. Referring now to FIG. 9, shown is a block diagram of a system in accordance with an embodiment of the present invention. As shown in FIG. 9, multiprocessor system 1500 is a point-to-point interconnect system, and includes a first processor 1570 and a second processor 1580 coupled via a point-to-point interconnect 1550. As shown in FIG. 9, each of processors 1570 and 1580 may be multicore processors, including first and second processor cores (i.e., processor cores 1574*a* and 1574*b* and processor cores 1584*a* and 1584*b*), although potentially many more cores may be present in the processors. Each of the processors can include a PCU or other power management logic to perform processor-based power management as described herein.

Still referring to FIG. 9, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 9, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 9, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 9, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520.

Figure 10:
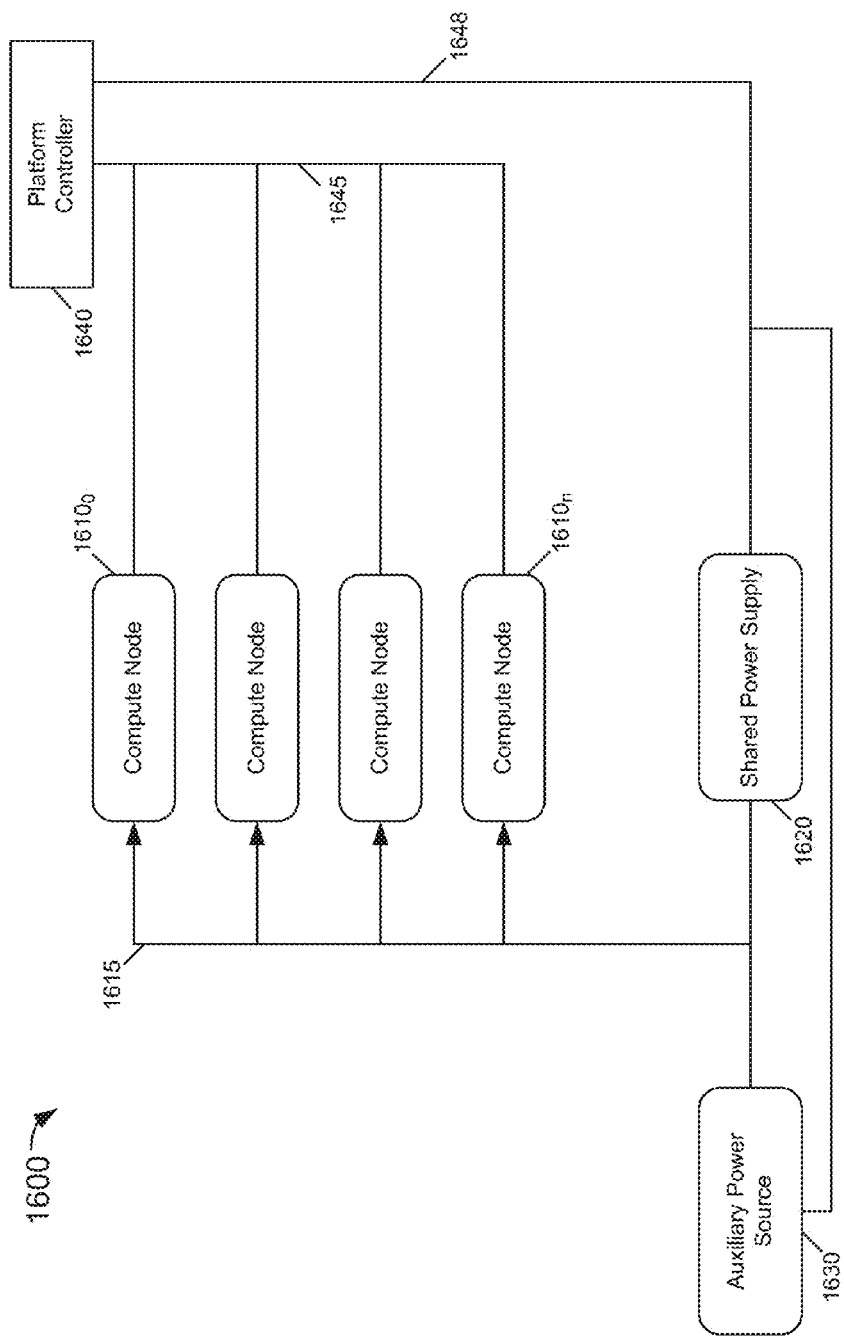
FIG. 10 is a block diagram of a power system arrangement in accordance with an embodiment of the present invention.

Referring now to FIG. 10, shown is a block diagram of a power system arrangement in accordance with an embodiment of the present invention. More specifically, a computing environment 1600 is shown having a plurality of compute nodes $1610_0$-$1610_n$. In an embodiment, each compute node may correspond to a server computer such as a given server of a rack-based system. In various embodiments, compute nodes 1610 may be configured as standard servers, blade servers, high density micro-servers or so forth. In any case, each compute node 1610 may include at least one or more processors, system memory, mass storage, and network interface circuitry. Understand of course that in various implementations, compute node 1610 may include many additional components. Embodiments assume an implementation in which each compute node 1610 is configured on a circuit board such as a motherboard adapted within a chassis installed in one or more racks of a cabinet, although other arrangements are possible.

In such implementations, compute nodes $1610_0$-$1610_n$ couple via a power bus 1615 to a shared power supply 1620, which in an embodiment may be a single shared power supply to provide power to all compute nodes of the chassis. Depending on implementation, shared power supply 1620 may be sized to provide power to between approximately 8 and 32 individual compute nodes. And more specifically as described herein, shared power supply 1620 may be configured to provide at least a long term maximum power level to each of compute nodes 1610. For purposes of explanation, assume that eight compute nodes 1610 are coupled to shared power supply 1620, and that each compute node is configured to have a long term maximum power level (PL1) of 40 Watts. In such case, shared power supply 1620 may be configured to provide 320 Watts to compute nodes 1610 via power bus 1615.

As further illustrated in FIG. 10, an auxiliary power source 1630 is further coupled to power bus 1615, e.g., at an output of shared power supply 1620. Auxiliary power source 1630 may be configured to provide additional power beyond that provided by shared power supply 1620 in cases of a power spike exceeding the maximum power output of shared power supply 1620.

Still referring to FIG. 10, in addition to the power connection between shared power supply 1620, auxiliary power source 1630 and corresponding compute nodes 1610, additional connections are present in computing environment 1600. More specifically, a platform controller 1640 is present and is coupled to corresponding compute nodes 1610 by way of a management interconnect 1645. In one embodiment, platform controller 1640 may be implemented as a baseboard management controller implemented on a separate motherboard to be adapted within the chassis. In other instances, platform controller 1640 may take the form of one or more integrated circuits to act as a controller for one or more of compute nodes 1610 and/or a corresponding portion of computing environment 1600.

For purposes of discussion herein, platform controller 1640 may provide management commands to corresponding compute nodes 1610 to cause appropriate power states and/or performance states to be initiated within the compute nodes in response to high power events occurring within computing environment 1600, as will be described further below.

Platform controller 1640 is further coupled to shared power supply 1620 and auxiliary power source 1630 by way of a separate sideband interconnect 1648. Via interconnect 1648, status information regarding these power sources may be provided to platform controller 1640. As one such example, a discharge signal may be sent upon occurrence of a discharge event by auxiliary power source 1630, which may cause platform controller 1640 to initiate power management activities within one or more of compute nodes 1610, e.g., via assertion of a thermal event, as described further below.

In an embodiment, auxiliary power source 1630 is a supercapacitor (or ultracapacitor) charge storage device that enables a much higher (by several orders of magnitude) charge storage per unit mass/volume than a conventional capacitor charge storage device. Although the scope of the present invention is not limited in this regard, in an embodiment this device may store on the order of approximately two Farads per cubic centimeter. Thus a supercapacitor may enable much higher peak power per unit mass/volume than a battery. In different embodiments, different types of supercapacitors may be used. For example, the supercapacitor may be implemented as an electrochemical capacitor that has an electrostatic double-layer capacitance, electrochemical pseudo capacitance, or combinations thereof. As examples, electrostatic double-layer capacitors may use carbon electrodes or derivatives thereof to realize a Helmholtz double layer at an interface between surfaces of an electrode and electrolyte. In turn, an electrochemical pseudocapacitor may use metal oxide or conducting polymer electrodes. Note that the electrolyte in such supercapacitors forms a conductive connection between multiple electrodes. In other cases, a suitably designed battery such as a given rechargeable battery, e.g., lithium ion, may instead be used for auxiliary power source 1630. Such battery may be used where it is configured with sufficient stored energy and maximum current delivery capabilities.

As shown in FIG. 10, auxiliary power source 1630 may be coupled at the output of shared power supply 1620 to provide sufficient energy (beyond the capacity of shared power supply 1620) for any spike up to a sum of Pmax of all coupled compute nodes. At the same time, understand that shared power supply 1620 is designed to have a reduced size closely aligned to match a realistic load. As an example, in one embodiment shared power supply 1620 may be configured to handle a maximum power level at least equal to (and possibly exceeding) a thermal design power (TDP) value (described further below) of all coupled compute nodes. In one particular case, shared power supply 1620 may be size to support a power level higher than a thermal design power level of all coupled compute nodes (e.g., approximately 1.2×TDP).

Embodiments may thus provide sufficient power support for all worst case scenarios. In contrast, a system having an undersized shared power supply designed to be large enough to support most real applications, but not sized to handle a worst-case simultaneous load on all nodes simultaneously, may result in electrical failure and a system crash across multiple nodes when such load occurs. Instead embodiments do not compromise survivability across such events. Embodiments further increase reliability over a system including simple capacitors, e.g., as included in a compute node motherboard, as such capacitors are insufficient to support the magnitudes and durations of electrical spikes across multiple nodes.

In other embodiments, an auxiliary power source may be provided in a system including single-node power supplies. In such cases, a supercapacitor may be provided per node.

Note that a high power event (Pmax) is characterized by a specific duration and magnitude, where the duration and magnitude may be provided as part of a specification for given components of a node. In many cases, a processor of the node (e.g., a multicore general-purpose processor) may have the largest dynamic power of all components of the node. As an example, a processor such as a server-based processor may have a Pmax of 2×TDP, which is a maximum power consumption level at which the processor can operate for a very short time period. As an example, a processor may be specified to have a Pmax of 2×TDP designed to be sustained for a duration no more than 100 microseconds. In turn, the same processor may be specified to have another power consumption level at a lower power level (PL2) than a Pmax. In an example, this PL2 level may enable operation at a higher (which may be approximately 1.2×TDP) than sustainable power level for a longer time duration (e.g., 1 second). And a long term maximum power level (PL1) may be set at a TDP level at which power may be sustained indefinitely.

Auxiliary power source 1630 thus provides a ride-through capability that enables shared power supply 1620 to be sized for more reasonable loads instead of the worst case. As such, shared power supply 1620 is sized to fully supply the long-term baseline power needs (such as TDP), and in some case may supply a higher power level, e.g., of 1.2×TDP. As used herein, the term "baseline" with respect to power means a level sufficient to accommodate long term operation but insufficient to accommodate power spikes to a Pmax level. In turn, auxiliary power source 1630 may be adapted to store sufficient energy to supply the difference between this baseline power level and a power spike reaching up to Pmax for all compute nodes 1610 for the entire duration of the spike.

To this end, in an embodiment, auxiliary power source 1630 may be sized to store sufficient energy to supply a difference between a maximum output from shared power supply 1620 (a baseline power) for at least a duration sufficient to accommodate the length of the power spike. Thus in one embodiment auxiliary power source 1630 may be configured to have a minimum energy stored as follows:

$$\text{Minimum Energy Stored}(E)=(P\text{max}-TDP)*\text{DURATION} \quad [\text{EQ. 1}]$$

where Pmax is the maximum peak power for all coupled compute nodes, TDP is a baseline power level (which may be provided by shared power supply 1620), and DURATION is a specified time period of the maximum peak power consumption (e.g., as identified in a design specification of the compute node).

In turn, auxiliary power source 1630 may be configured to store a charge level of:

$$\text{Charge stored}(C)=(P\text{max}-TDP)*\text{DURATION}/\text{POWER\_SUPPLY\_OUTPUT\_VOLTAGE} \quad [\text{EQ. 2}]$$

where Power_Supply_Output_Voltage is the output voltage level of shared power supply 1620. In turn, auxiliary power source 1630 may be configured to provide a peak output current sufficient to accommodate this difference between peak and baseline currents as follows:

$$\text{Peak output current}(I\text{out})=(P\text{max}-TDP)/\text{POWER\_SUPPLY\_OUTPUT\_VOLTAGE} \quad [\text{EQ. 3}]$$

Embodiments may further provide a mechanism for shared power supply 1620 to recharge auxiliary power source 1630, which may be realized by coupling the supercapacitor to the output of shared power supply 1620. Embodiments further may provide a mechanism to prevent recurrence of a power spike after a first power spike, at least until the supercapacitor or other auxiliary power source has recharged. In some designs, there may internal node features to guarantee that a specific interval occurs between Pmax power spike events. For example, a power control unit of a processor and/or a power management unit of a node (such as a power management IC) may be configured to prevent system operation over the TDP level (for example) for a duration of this interval. In such cases, auxiliary power source 1630 may be designed to ensure that the time it takes to be recharged after a Pmax event is shorter than the inter-Pmax time specification of the processor and/or compute node.

In other systems, an interval guarantee may not exist or may be insufficient to enable complete recharge. If that is the case, platform controller 1640 (or other control logic of the system, e.g., internal to a processor, compute node, or chassis) may be configured to cause one or more nodes (e.g., all nodes) to enter into a low power state until recharge has completed. As one example, platform controller 1640 may cause this low power state to occur via any (or a combination of) node power management features, including (but not limited to) a thermal event assertion (even if no actual thermal event is detected), imposition of lower power limits and/or a reduced programmable maximum current/maximum power value for one or more components of the compute nodes.

In one embodiment, a thermal event may be triggered by a platform controller issuing an over temperature signal, which in turn may be sent to a processor of one or more of the compute nodes. Responsive to receipt of such thermal event assertion, a power controller (such as PCU) of the processor may perform various power management operations internal to the processor. Such power management operations may include one or more of throttling of instructions, reducing a performance state and/or an activity state, preventing execution of certain types of instructions (e.g., high power instructions such as single instruction multiple data (SIMD) instructions), or so forth. Understand that in certain embodiments, thermal event assertion signals may be provided to other components of a compute node to enable reduced power consumption in such components.

Figure 11:
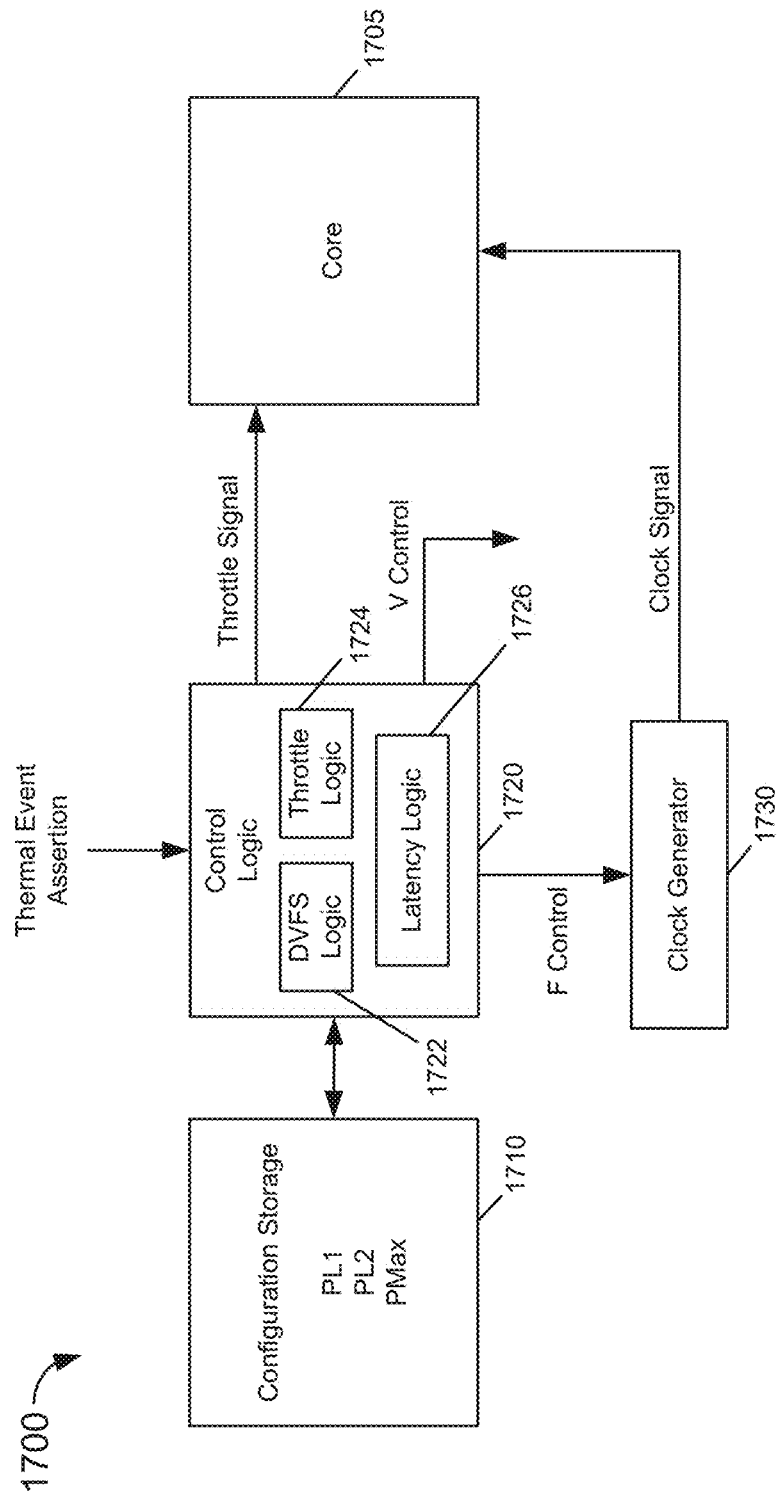
FIG. 11 is a block diagram of a portion of a processor in accordance with an embodiment.

Referring now to FIG. 11, shown is a block diagram of a portion of a processor in accordance with an embodiment. As shown in FIG. 11, processor 1700, which may be a single core or multicore processor for implementation in a compute node as described herein, includes at least one core 1705. Of course, in a given implementation of a multicore processor, a plurality of such cores may be provided, which in different variations can be implemented as a set of homogeneous cores or a mixture of heterogeneous cores.

Further illustrated in FIG. 11 is a configuration storage 1710. In various embodiments, configuration storage 1710 may be a non-volatile storage that includes various configuration values for the processor, e.g., as written during manufacturing, such as a result of manufacturing characterization of the processor. Various operating parameters may be stored in different entries of configuration storage 1710. For purposes of discussion herein, configuration storage 1710 may include a plurality of entries associated with power consumption levels at which the processor may be allowed to operate in different power modes. For the examples described herein, at least three different power consumption levels, corresponding to a long term power consumption level (PL1), a first higher power consumption level (PL2) and a second higher power consumption level, which may be a peak power level (Pmax) at which the processor can operate for a minimum time duration. Understand that in addition to storage of these power consumption levels, the corresponding durations for which the processor may operate at such power consumption levels also may be included in the corresponding entries (at least for PL2 and Pmax).

To enforce these power consumption levels, a control logic 1720 is coupled to configuration storage 1710. In various embodiments, control logic 1720 may be implemented within a PCU or other power controller of processor 1700. In the representative example of FIG. 11, control logic 1720 includes a DVFS logic 1722 to perform dynamic voltage and/or frequency scaling, a throttle logic 1724, and a latency logic 1726.

Depending on a variety of operating conditions, DVFS logic 1722 may enable one or more cores 1705 to operate at higher power consumption levels (e.g., at higher voltage and/or frequency levels), such as desired for increased performance. To this end, DVFS logic 1722 may cause a frequency control signal to be sent to a clock generator 1730, which in turn generates one or more clock signals for core 1705. In various embodiments, clock generator 1730 may be implemented as a phase lock loop or a delay lock loop. In some embodiments, a processor may include multiple such clock generators, each associated with one or more corresponding cores 1705. In addition, DVFS logic 1722 may further issue a voltage control signal sent to, e.g., a voltage regulator to cause a change in a regulated voltage provided to a corresponding core 1705. In some embodiments, a processor may include one or more integrated voltage regulators (not shown for ease of illustration in FIG. 11), each associated with one or more cores. In other cases, a processor may couple to one or more external voltage regulators that provide such regulated voltages.

Throttle logic 1724 may, responsive to indications of one or more constraints on the processor (such as a temperature constraint, a power budget constraint or so forth) cause operation of one or more cores 1705 to be throttled. Such throttling may in some cases result in a slower rate of instruction issuance and execution globally. In other cases, throttling may be implemented by reducing instruction throughput of particular high power consuming instructions, such as SIMD instructions.

With further reference to control logic 1720, latency logic 1726 may determine when processor 1700 has operated at a level exceeding, e.g., PL2 and enforce a threshold latency duration in which processor operation is prevented from operating higher than a threshold power consumption level (e.g., PL1 or PL2). Note that in some cases this threshold latency duration may be indicated by a configuration value stored in configuration storage 1710.

As further shown in FIG. 11, control logic 1720 may receive a thermal event assertion, which may be received from a platform controller of a multi-node system in which the processor is located. In some cases this thermal event assertion may be responsive to detection of a platform-level thermal event. Responsive to this signal, one or more of DVFS logic 1722, throttle logic 1724 and/or latency logic 1726 may operate to reduce a level of power consumption to thus aid in reducing the temperature of the platform. However, in other cases as described herein assertion of this thermal event may be received responsive to a discharge event by an auxiliary power source, without regard to whether a true thermal event is occurring. Regardless of the reason for assertion of the thermal event, control logic 1720 and its constituent logics may take appropriate actions to reduce power consumption while such thermal event is asserted. Understand while shown at this high level in the embodiment of FIG. 11, many variations and alternatives are possible.

Figure 12:
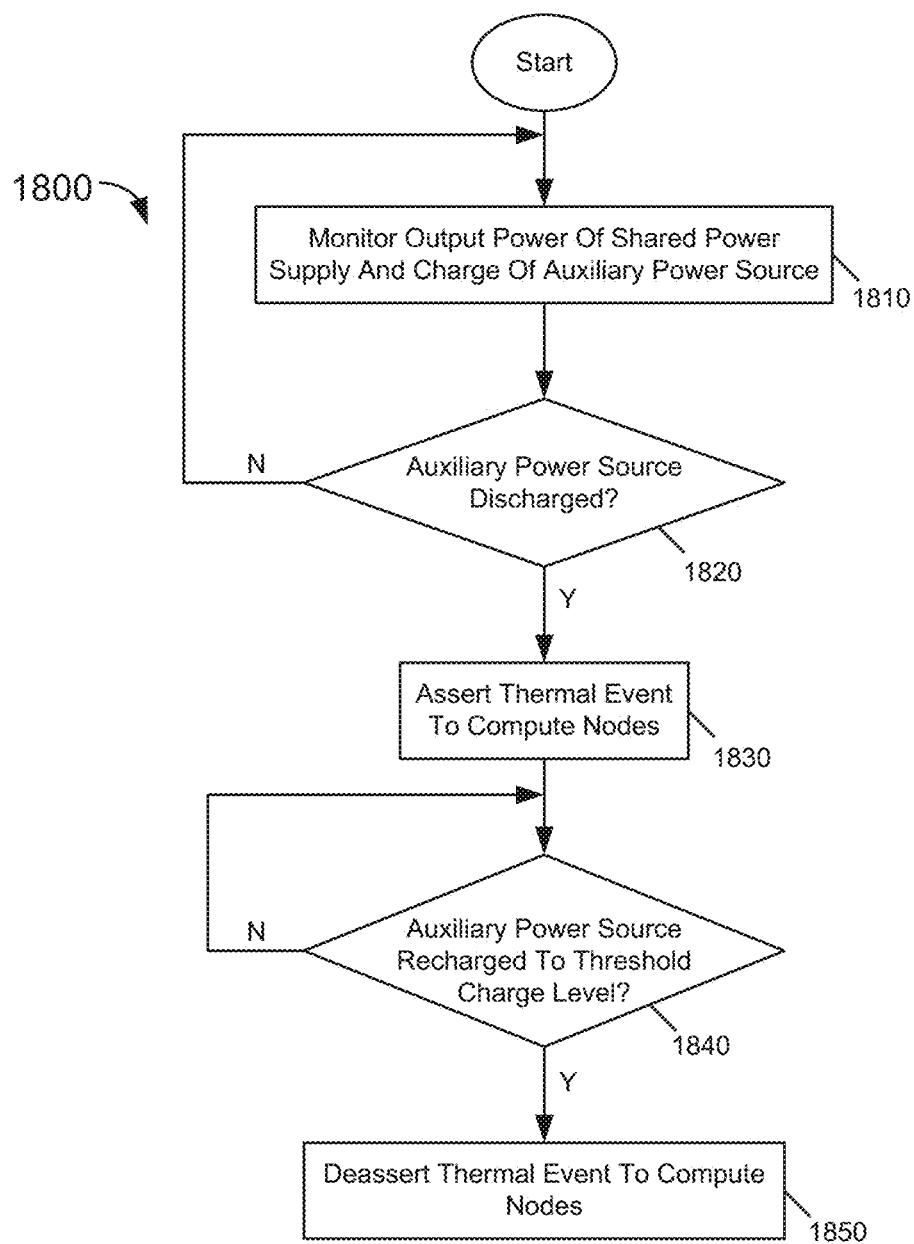
FIG. 12 is a flow diagram of a method in accordance with an embodiment of the present invention.

Referring now to FIG. 12, shown is a flow diagram of a method in accordance with an embodiment of the present invention. As shown in FIG. 12, method 1800 may be performed by a platform controller of a multi-node arrangement, such as a baseboard management controller or other platform controller of multiple compute nodes located, e.g., within a rack of servers. To this end, the platform controller may include appropriate combinations of hardware, software and/or firmware to perform the operations of method 1800, in addition to other platform management operations.

As seen, method 1800 begins by monitoring output power of a shared power supply and a charge level of an auxiliary power source (block 1810). For example, with reference back to FIG. 10, platform controller 1640 may couple via sideband interconnect 1648 to shared power supply 1620 and auxiliary power source 1630. Next it can be determined whether the auxiliary power source has been discharged (diamond 1820) such as by way of a discharge event when one or more compute nodes operates at a Pmax level. If so, control passes to block 1830 where a thermal event is asserted to the compute nodes. Note that the assertion of this thermal event, which may be by way of activation of a thermal event signal on a management interconnect coupled between the node controller and the compute nodes, is asserted regardless of whether a true thermal event has been detected within the computing environment. Control next passes to diamond 1840 to determine whether the auxiliary power source has been recharged to a threshold charge level (diamond 1840). Such determination may be based on information received from the auxiliary power source. In other cases, the threshold charge level determination may be based on a specification of a time duration in which a charging operation is expected to occur. In either case, when the auxiliary power source is determined to be recharged to the threshold charge level, control passes to block 1850 where the thermal event can be deasserted to the compute nodes.

Understand that during assertion of the thermal event, the various compute nodes including constituent components thereof such as the processors of the compute nodes (which may be the highest consumers of dynamic power), may take various actions to reduce power consumption as described herein. Further understand while shown at this high level in the embodiment of FIG. 12, the scope of the present invention is not limited in this regard.

Embodiments may thus reduce rack and datacenter-level cost by allowing smaller (and less expensive) shared power supplies within a given performance/thermal envelope. Embodiments may further enable increased rack and data compute density by allowing smaller form factor designs, realized by the smaller power supplies as described herein. Still further, performance may be enhanced within a given shared power supply sizing by allowing more and/or higher-performance compute nodes to be present.

The following examples pertain to further embodiments.

In one example, a processor comprises: at least one core; a clock generator to provide a clock signal to the at least one core; and a power controller coupled to the at least one core and the clock generator, the power controller including a first control logic to receive a thermal event assertion from a platform controller to couple to the processor, and cause a reduction in a frequency of the clock signal responsive to the thermal event assertion. The platform controller may output the thermal event assertion responsive to a discharge event of an auxiliary power source to couple to a compute node including the processor, without detection of a thermal event.

In an example, the processor further comprises a configuration storage to store a first power consumption level corresponding to a long term allowable power consumption level, a second power consumption level corresponding to a first excursion level from the first power consumption level allowable for a first time duration, a third power consumption level corresponding to a second excursion level from the first power consumption level allowable for a second time duration.

In an example, the first control logic is to prevent the processor from operation at the third power consumption level after a first operation at the third power consumption level for a threshold latency duration.

In an example, the first control logic is, after receipt of the thermal event assertion, to prevent the processor from operation at the third power consumption level until a thermal event deassertion is received.

Note that the above processor can be implemented using various means.

In another example, a system comprises: a plurality of compute nodes to couple in a chassis; a first shared power supply to provide power to the plurality of compute nodes, the first shared power supply to provide a baseline power level to the plurality of compute nodes; and an auxiliary power source to provide power to one or more of the plurality of compute nodes when the one or more of the plurality of compute nodes are to operate at a higher power level than the baseline power level.

In an example, the auxiliary power source comprises a supercapacitor.

In an example, the auxiliary power source comprises a battery.

In an example, the auxiliary power source is coupled to an output of the first shared power supply.

In an example, the plurality of compute nodes comprises a plurality of micro-servers.

In an example, the auxiliary power source is to provide a ride-through power to the one or more of the plurality of compute nodes to accommodate a power spike occurrence on the one or more of the plurality of compute nodes.

In an example, the auxiliary power source is to store at least an energy corresponding to a difference between a maximum peak power level of the plurality of compute nodes and the baseline power level of the plurality of compute nodes multiplied by a duration of the maximum peak power level.

In an example, the auxiliary power source is to store at least a charge corresponding to the difference divided by an output voltage of the first shared power supply.

In an example, the auxiliary power source is to provide a maximum output current corresponding to the difference divided by the output voltage of the first shared power supply.

In an example, the first shared power supply is to recharge the auxiliary power source after a discharge event of the auxiliary power source.

In an example, the system further comprises a platform controller coupled to the plurality of compute nodes, where the platform controller is to cause one or more of the plurality of compute nodes to enter a low power state after the discharge event of the auxiliary power source, to enable the auxiliary power source to be recharged to a threshold level.

In an example, each of the plurality of compute nodes comprises a processor, a memory, and a network interface circuit adapted on a circuit board.

In another example, a method comprises: monitoring, via a platform controller of a multi-node system, a charge level of an auxiliary power source coupled to a shared power supply and a plurality of compute nodes of the multi-node system; and responsive to a discharge event of the auxiliary power supply, asserting a thermal event to the plurality of compute nodes, regardless of a temperature of the plurality of compute nodes, to prevent the plurality of compute nodes from power consumption exceeding a power delivery output of the shared power supply.

In an example, the method further comprises determining whether the auxiliary power source is recharged to a threshold charge level.

In an example, the method further comprises responsive to determining that the auxiliary power source is recharged to the threshold charge level, deasserting the thermal event to the plurality of compute nodes.

In an example, the thermal event assertion is to cause one or more of the plurality of compute nodes to enter a low power state until the thermal event is deasserted.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   at least one core;
   a clock generator to provide a clock signal to the at least one core; and
   a power controller coupled to the at least one core and the clock generator, the power controller including a first control logic to receive a thermal event assertion comprising an over temperature signal from a platform controller to couple to the processor, and cause a reduction in a frequency of the clock signal responsive to the thermal event assertion,
   wherein the platform controller is to output the thermal event assertion responsive to a discharge event of an auxiliary power source to couple to a plurality of compute nodes including a first compute node having the processor, without detection of a thermal event,
   wherein the auxiliary power source is to provide power to one or more of the plurality of compute nodes when the one or more of the plurality of compute nodes are to operate at a higher power level than a baseline power level provided by a shared power supply to couple to the plurality of compute nodes.

2. The processor of claim 1, wherein the processor further comprises a configuration storage to store a first power consumption level value corresponding to a long term allowable power consumption level, a second power consumption level value corresponding to a first excursion level from the first power consumption level allowable for a first time duration, a third power consumption level value corresponding to a second excursion level from the first power consumption level allowable for a second time duration.

3. The processor of claim 2, wherein the first control logic is to prevent the processor from operation at the third power consumption level after a first operation at the third power consumption level for a threshold latency duration.

4. The processor of claim 2, wherein the first control logic is, after receipt of the thermal event assertion, to prevent the processor from operation at the third power consumption level until a thermal event deassertion is received.

5. A non-transitory machine-readable medium having stored thereon instructions, which if performed by a machine cause the machine to perform a method comprising:
   monitoring, via a platform controller of a multi-node system, a charge level of an auxiliary power source coupled to a shared power supply and a plurality of compute nodes of the multi-node system, at least one of the plurality of compute nodes having a processor comprising at least one core, a clock generator to provide a clock signal to the at least one core, and a power controller coupled to the at least one core and the clock generator, the power controller including a first control logic to receive a thermal event assertion comprising an over temperature signal from the platform controller, and cause a reduction in a frequency of the clock signal responsive to the thermal event assertion, without detection of a thermal event in the at least one compute node; and
   responsive to a discharge event of the auxiliary power source, asserting by the platform controller the thermal event assertion comprising the over temperature signal to the plurality of compute nodes, regardless of a temperature of the plurality of compute nodes and without detection of a thermal event in the plurality of compute nodes, to prevent the plurality of compute nodes from power consumption exceeding a power delivery output of the shared power supply.

6. The non-transitory machine-readable medium of claim 5, wherein the method further comprises determining whether the auxiliary power source is recharged to a threshold charge level.

7. The non-transitory machine-readable medium of claim 6, wherein the method further comprises responsive to determining that the auxiliary power source is recharged to the threshold charge level, deasserting the thermal event assertion to the plurality of compute nodes.

8. The non-transitory machine-readable medium of claim 5, wherein the thermal event assertion is to cause one or more of the plurality of compute nodes to enter a low power state until the thermal event assertion is deasserted.

9. A system comprising:
   a plurality of compute nodes to couple in a chassis;
   a first shared power supply to provide power to the plurality of compute nodes, the first shared power supply to provide a baseline power level to the plurality of compute nodes;
   an auxiliary power source to provide power to one or more of the plurality of compute nodes when the one or more of the plurality of compute nodes are to operate at a higher power level than the baseline power level; and
   a platform controller to output a thermal event assertion comprising an over temperature signal to the plurality of compute nodes responsive to a discharge event of the auxiliary power source, without detection of a thermal event; and
   wherein at least one of the plurality of compute nodes includes a processor comprising at least one core, a clock generator to provide a clock signal to the at least one core, and a power controller coupled to the at least one core and the clock generator, the power controller including a first control logic to receive the thermal event assertion from the platform controller and cause a reduction in a frequency of the clock signal responsive to the thermal event assertion.

10. The system of claim 9, wherein the auxiliary power source comprises a supercapacitor.

11. The system of claim 9, wherein the auxiliary power source comprises a battery.

12. The system of claim 9, wherein the auxiliary power source is coupled to an output of the first shared power supply.

13. The system of claim 9, wherein the plurality of compute nodes comprises a plurality of micro-servers.

14. The system of claim 9, wherein the auxiliary power source is to provide a ride-through power to the one or more of the plurality of compute nodes to accommodate a power spike occurrence on the one or more of the plurality of compute nodes.

15. The system of claim 9, wherein the auxiliary power source is to store at least an energy corresponding to a difference between a maximum peak power level of the plurality of compute nodes and the baseline power level of the plurality of compute nodes multiplied by a duration of the maximum peak power level.

16. The system of claim 15, wherein the auxiliary power source is to store at least a charge corresponding to the difference divided by an output voltage of the first shared power supply.

17. The system of claim 16, wherein the auxiliary power source is to provide a maximum output current corresponding to the difference divided by the output voltage of the first shared power supply.

18. The system of claim 9, wherein the first shared power supply is to recharge the auxiliary power source after a discharge event of the auxiliary power source.

19. The system of claim 18, wherein the platform controller is to cause one or more of the plurality of compute nodes to enter a low power state after the discharge event of the auxiliary power source, to enable the auxiliary power source to be recharged to a threshold level.

20. The system of claim 9, wherein each of the plurality of compute nodes comprises a processor, a memory, and a network interface circuit adapted on a circuit board.

* * * * *